(12) United States Patent
Pavlish (10) Patent No.: US 7,233,235 B2
(45) Date of Patent: Jun. 19, 2007

(54) APPARATUS AND METHOD FOR USING VEHICLE STATUS INFORMATION IN SAFETY RESTRAINT SYSTEMS

(75) Inventor: David L. Pavlish, Waterford, MI (US)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 10/978,645

(22) Filed: Nov. 1, 2004

(65) Prior Publication Data

US 2005/0149242 A1 Jul. 7, 2005

Related U.S. Application Data

(60) Provisional application No. 60/534,786, filed on Jan. 7, 2004.

(51) Int. Cl.
*B60Q 1/00* (2006.01)
(52) U.S. Cl. ............... 340/438; 340/439; 340/440; 340/457.4; 701/45
(58) Field of Classification Search ............... None
See application file for complete search history.

(56) References Cited

U.S. PATENT DOCUMENTS

| | | | | |
|---|---|---|---|---|
| 4,958,851 A * | 9/1990 | Behr et al. ............... 280/735 |
| 5,164,901 A * | 11/1992 | Blackburn et al. ............ 701/47 |
| 5,605,202 A * | 2/1997 | Dixon ............... 180/268 |
| 5,835,873 A * | 11/1998 | Darby et al. ............... 701/45 |
| 5,899,949 A | 5/1999 | Kincaid |
| 6,040,637 A | 3/2000 | Paganini et al. |
| 6,045,156 A * | 4/2000 | Spell et al. ............... 280/735 |
| 6,081,188 A * | 6/2000 | Kutlucinar et al. ......... 340/438 |
| 6,374,168 B1 * | 4/2002 | Fujii ............... 701/45 |
| 6,530,597 B1 * | 3/2003 | Nesper et al. ............ 280/735 |
| 6,542,073 B2 * | 4/2003 | Yeh et al. ............... 340/440 |
| 6,703,845 B2 * | 3/2004 | Stanley et al. ............ 324/663 |
| 2002/0017776 A1 | 2/2002 | Cox et al. |
| 2003/0004628 A1 | 1/2003 | Rennaker et al. |

* cited by examiner

*Primary Examiner*—Daniel Wu
*Assistant Examiner*—Son Tang
(74) *Attorney, Agent, or Firm*—Michael Best & Friedrich LLP (57) ABSTRACT

Method and devices for disabling detection of a safety system activation condition. One embodiment of the invention provides a method that includes disregarding information from a first set of sensors when detection of a safety system activation condition is disabled; determining if information from a second set of sensors in available; when information from a second set of sensors is not available, generating a warning signal; when information from the second set of sensors is available, determining a value of the information from the second set of sensors; and when the value of the information from the second set of sensors indicates that a vehicle is in use, enabling detection of the safety system activation condition.

12 Claims, 5 Drawing Sheets

APPARATUS AND METHOD FOR USING VEHICLE STATUS INFORMATION IN SAFETY RESTRAINT SYSTEMS

RELATED APPLICATIONS

The present application claims priority to U.S. provisional patent application Ser. No. 60/534,786 titled "APPARATUS AND MEHTOD FOR USING VEHICLE STATUS INFORMATION IN SAFETY RESTRAINTS SYSTEMS," filed on Jan. 7,2004.

FIELD OF THE INVENTION

Embodiments of the invention generally relate to methods and devices used in automotive occupant safety systems. More specifically, embodiments of the invention relate to providing additional information to occupant safety systems to reduce the probability that such systems will be inappropriately activated.

BACKGROUND OF THE INVENTION

Modern land vehicles include a number of occupant safety devices including, for example, automatically tensioned seat belts, air bags, and rollover sensing systems. In the case of air bags, their deployment may be based on information from a variety of sensors such as speed sensors, accelerometers, and angle sensors. In some cases these sensors are located remotely from a processing module, but in other cases one or more of the sensors may be housed together with processors and actuation controls in a relatively small unit. When not mounted in or on a vehicle, these small units can, in general, be readily manipulated and held by a person.

SUMMARY OF THE INVENTION

The inventor has learned that with certain airbag control and sensing modules ("ACMs") with integrated sensors it is possible for a person during testing, installation, or servicing to inadvertently cause the ACM to activate or deploy airbags (or other safety devices) connected to the ACM. In essence, handling of the ACM by a person, such as by rotating or turning over the housing, can cause the ACM to believe that a rollover condition has occurred. Deployment of air bags or other safety devices in such circumstances poses a potential danger to the technician or person handling the ACM. Accordingly, there is a need to improve the operation of vehicle safety systems so that inappropriate activations and deployments may be reduced.

Vehicle safety systems are often coupled with other sensors in order to activate and deploy the system carefully and precisely. For example, air bag deployment systems often include passenger weight and position sensors that are read to adjust the force, position, or disablement of an air bag during an accident. These supplemental sensors are related to the activation of the air bag and are used to ensure an air bag is deployed correctly during an accident so that it does not injure the passenger. The supplemental sensors do not, however, guarantee that the air bag will only be deployed when a situation requiring its activation truly exists. Even if the weight and position sensors indicate that the air bag should be disabled, the sensors are only being used to indicate the correct operation of the safety system during a possible collision and not that the operation of the safety system is unneeded since a collision has not actually occurred.

By sensing the status of the vehicle, including information regarding vehicle systems that perform operations required to fulfill the fundamental purpose of the vehicle, for example, transmission status, brake status, etc., rather than including only sensors that are related to the deployment of the safety system, the safety system detection can be disabled if the state of the vehicle is one where a situation requiring the activation of a safety system does not exist or is unlikely to occur.

In one embodiment, the invention provides a vehicle safety control module that includes a housing; at least one sensor located within the housing; and a processor located within the housing. The processor may be coupled to the at least one sensor, and be configured to control a vehicle safety system based on information received from the at least one sensor. The processor may also be configured to communicate with a vehicle information bus and to modify control of the vehicle safety system based on information received from the vehicle bus.

In another embodiment, the invention provides a method of controlling detection of a safety system activation condition. The method includes disregarding information from a first set of sensors when detection of a safety system activation condition is disabled; determining if information from a second set of sensors is available; when information from a second set of sensors is not available, generating a warning signal; when information from the second set of sensors is available, determining a value of the information from the second set of sensors; and when the value of the information from the second set of sensors indicates that a vehicle is in use, enabling detection of the safety system activation condition. The value of the information received from the second set of sensors may also indicate that the vehicle is not in use therefore disabling detection of the safety system activation condition.

In another embodiment, the invention provides a method of preventing activation of a safety system during servicing of a vehicle. The method includes disabling the safety system during power-up; disregarding information from a first set of sensors when the safety system is disabled; determining if information from a second set of sensors is available; determining a value of the information from the second set of sensors; and when the value of the information from the second set of sensors indicates that a vehicle is in use, enabling detection of the safety system activation condition. The value of the information received from the second set of sensors may also indicate that the vehicle is not in use therefore disabling detection of the safety system activation condition. A indication of the status of the safety system, for example, disabled or enabled, may also be presented so that a technician or mechanic will know when it is safe to handle a module involved in activating a safety system.

In yet another embodiment, the invention provides a computer readable medium containing instructions for controlling a vehicle safety system. The medium contains instructions for disabling the vehicle safety system; determining if a set of vehicle status information is available; if information from the set of vehicle status information is available, determining whether the vehicle state is one in which an unsafe condition is likely to occur; and if the vehicle state is one in which an unsafe condition is likely to occur, enabling the vehicle safety system. The computer readable medium may also contain instructions for generating a warning signal if the set of vehicle status information is unavailable.

Additional objects and features of the invention are illustrated in the drawings and provided in the subsequent description.

DETAILED DESCRIPTION

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless the context indicates otherwise, the terms "mounted," "connected," and "coupled" are used broadly and encompass both direct and indirect mounting, connecting, and coupling. Further, "connected" and "coupled" are not restricted to physical or mechanical connections or couplings.

Figure 1:
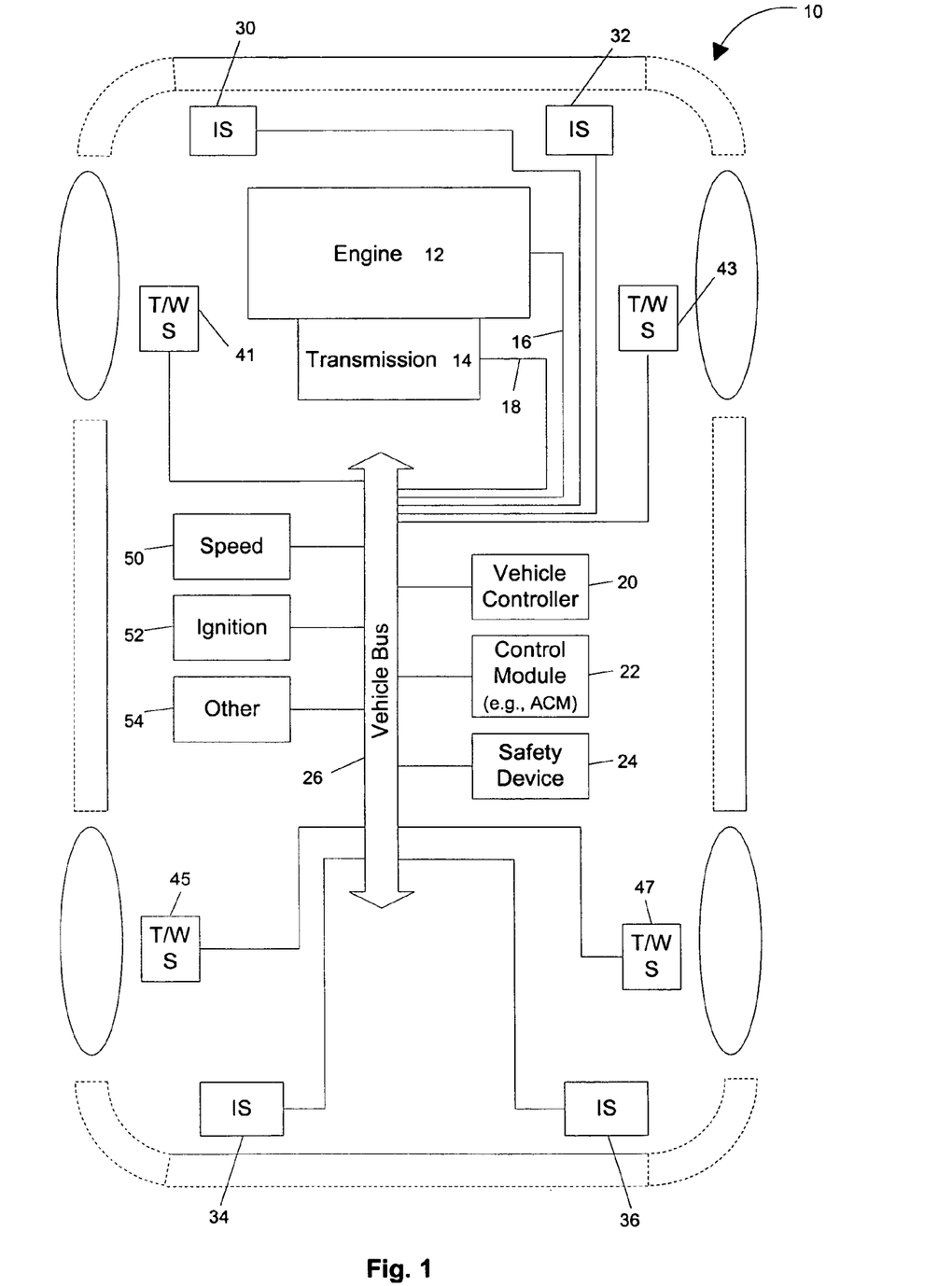
FIG. 1 is a schematic diagram of a vehicle with a control module configured according to one embodiment of the invention installed in the vehicle.

Referring to the drawings, FIG. 1 illustrates an exemplary vehicle 10 having an engine 12 and a transmission 14. The engine 12 and transmission 14 may be fitted with a number of sensors. For example, the engine can be monitored using temperature, rpm, oxygen, and a variety of other sensors. The transmission may also be monitored with sensors such as temperature sensors and sensors that provide an indication as to whether the transmission is in gear or in neutral, whether the transmission is in park (for automatic transmissions), and other sensors for indicating which gear the transmission is in (e.g., reverse, first, second, third, etc.) (all not shown). The data may be transmitted to one or more controllers or control modules such as a vehicle controller 20 (which might control fuel injectors, ignition, throttle and other aspects of an engine) and a control module 22, which may be a controller designed to control a safety system such as an airbag system. Safety systems in the vehicle 10 are shown schematically as block 24.

It should be understood that the control system illustrated in FIG. 1 is meant to be representative. In practice, the control operations and functions required in a vehicle such as the vehicle 10 may be carried out by multiple, physically separate control modules or may be combined in a single control module. In general, each control module will include such well-known components such as a processor, memory, and input and output interfaces. In many vehicle systems, software executed by the processors is stored in ROM, such as EEPROM, although other memory could be used.

The various sensors and controllers or control modules used in the vehicle 10, may communicate over a vehicle bus 26. In the embodiment shown, the bus 26 is linked to a variety of sensors (again the links shown are representative and could be implemented using a variety of wired and wireless connections). The sensors shown include impact sensors 30, 32, 34, and 36, which may be mounted in or near the bumpers (not shown) of the vehicle 10. In addition, wheel-speed, tire, and brake sensors may be connected to the bus 26. In the embodiment shown, single units labeled "T/W S" 41, 43, 45, and 47 are illustrated and represent the various sensors that may be used to sense activity in a vehicle wheel. In addition, in the embodiment shown in FIG. 1, a separate speed sensor 50 is shown, although such a sensor may not be needed if speed is sensed using the wheel sensors. The vehicle 10 may also include an ignition sensor 52, which may for example, provide an indication as to whether the ignition switch has been turned to a start, on, or off position. Finally, it is possible that numerous other sensors could be used in or with the vehicle 10 and these sensor are represented by block 54.

Figure 2:
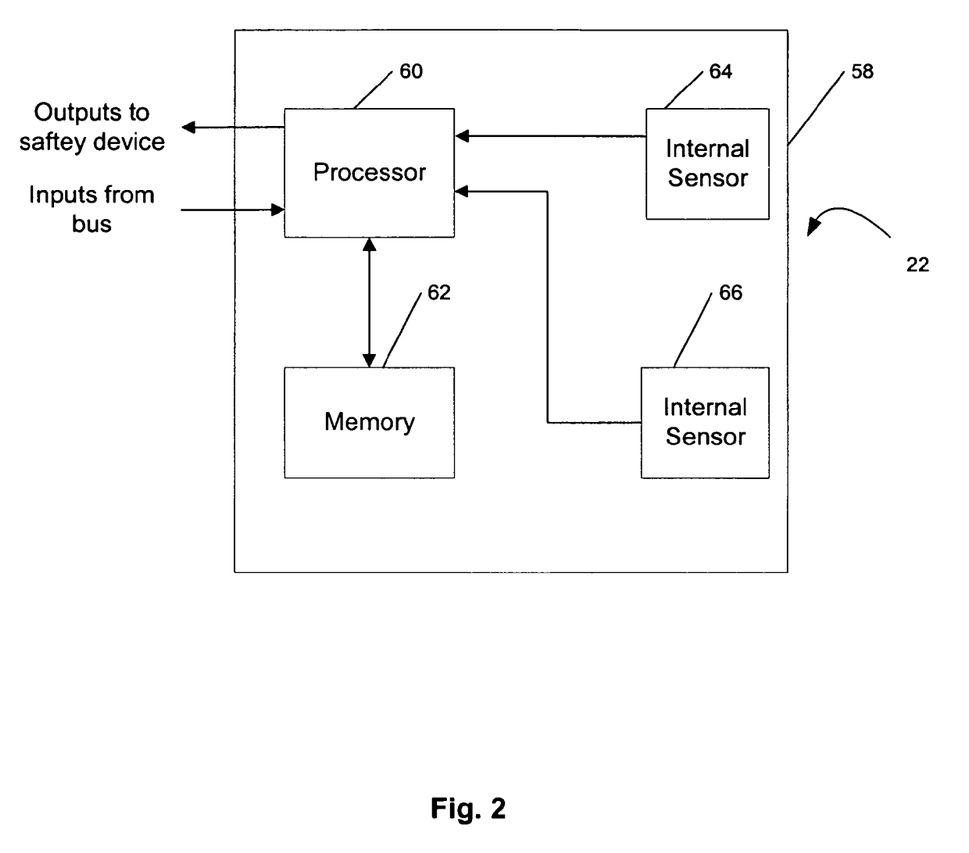
FIG. 2 is an illustration of the control module in FIG. 1.

FIG. 2 illustrates the control module 22 in greater detail. The control module 22 may include a housing 58 and a processor 60. The processor is capable of communicating with the bus 26 by, for example, retrieving information on the bus that was obtained from one or more of the many sensors shown in the vehicle 10. In addition the processor 60 may, based on information it receives from internal sensors (discussed below), create command signals to cause the safety system 24 to deploy. The control module 22 may also include a memory 62 and one or more internal sensors represented by sensors 64 and 66. For example, when the control module 22 takes the form of an ACM, the sensors 64 and 66 may be sensors that provide information such as acceleration and roll angle used to determine whether a rollover condition exists. If a rollover condition is determined to exist, the processor 60 generates a command signal to cause activation or deployment of the safety system 24 (e.g., one or more airbags, seat-belt tensioners, etc.).

In embodiments of the invention, the basic operation of the control module 22 is modified so that activation of the safety system does not occur unless certain other conditions are met. The required conditions are those that provide an environment where an unsafe situation may occur. This is best understood by reference to the flow chart in FIG. 3. In one embodiment of the invention, the control module 22 is configured (for example, through appropriate programming code) to determine whether the vehicle 10 is in a state in which rollover detection (or more broadly, detection of a predetermined condition that results in activation of an occupant safety system) is appropriate. As shown, the first step in the process is an initial power-up or boot-up process (step 100), after which the initial default status of rollover detection is set to "disabled" (step 101). In the disabled mode, the control module 22 senses inputs from the internal sensors 64 and 66 and it is configured to do, but disregards the inputs. In the disabled mode, the control module 22 does not process the inputs to determine if activation of a safety system is warranted. The control module 22 then checks to see if additional external information is available, as shown at step 102. In the example shown, a check of transmission status information is made. If the chosen external status information is not available (which might be caused, for example, by the presence of a loose wire), the control module generates a signal to turn on a warning lamp, indicating that the control module is not receiving desired external information, as shown at step 103. If the external status information is available, the control module then determines the value of the status information (step 104). In the example shown, the control module 22 determines whether the transmission is in park. If so, the mode of rollover detection is set to disabled (step 105). Otherwise, the rollover detection mode is set to enabled (step 106). In other words, if the control module receives information that indicates that the vehicle is in use, it is then appropriate or at least more appropriate for the control module to check for the existence of a rollover condition and, if such a condition exists, to activate a safety system such as an airbag. If the control module is being tested or serviced (and the vehicle presumably not in use), it is likely that either external status information is not available (e.g., the control module 22 is removed from the vehicle 10 and, therefore, disconnected from the bus 26) or that the status information indicates that the vehicle is not in use. In either case, activation of a vehicle occupant safety system should be unnecessary. In addition, when external information is not available a warning (such as visual or audible signal perceptible by a human being) should be generated to alert a person to a possible condition where a malfunction has occurred or a condition exists where a control module may be connected to a safety device (airbag, explosive device to inflate an airbag, etc.), but disconnected to sources of vehicle information such that it could be possible for activation of an occupant safety device to occur although the vehicle is not in a state warranting such activation. An additional warning or indication signal could also be generated to provide the vehicle safety system status to an operator or technician. The signal could specify whether the vehicle safety system is enabled or disabled so that the operators and technicians are aware of when the system is enabled and when the system is disabled. Vehicle operators can use the signal to monitor the performance of the safety system and ensure that it enabled and disabled when it should be, and the technician can use the signal to know when it is safe to test, install, or generally service a component that may cause the unneeded activation of the safety system if the system is enabled.

Figure 3:
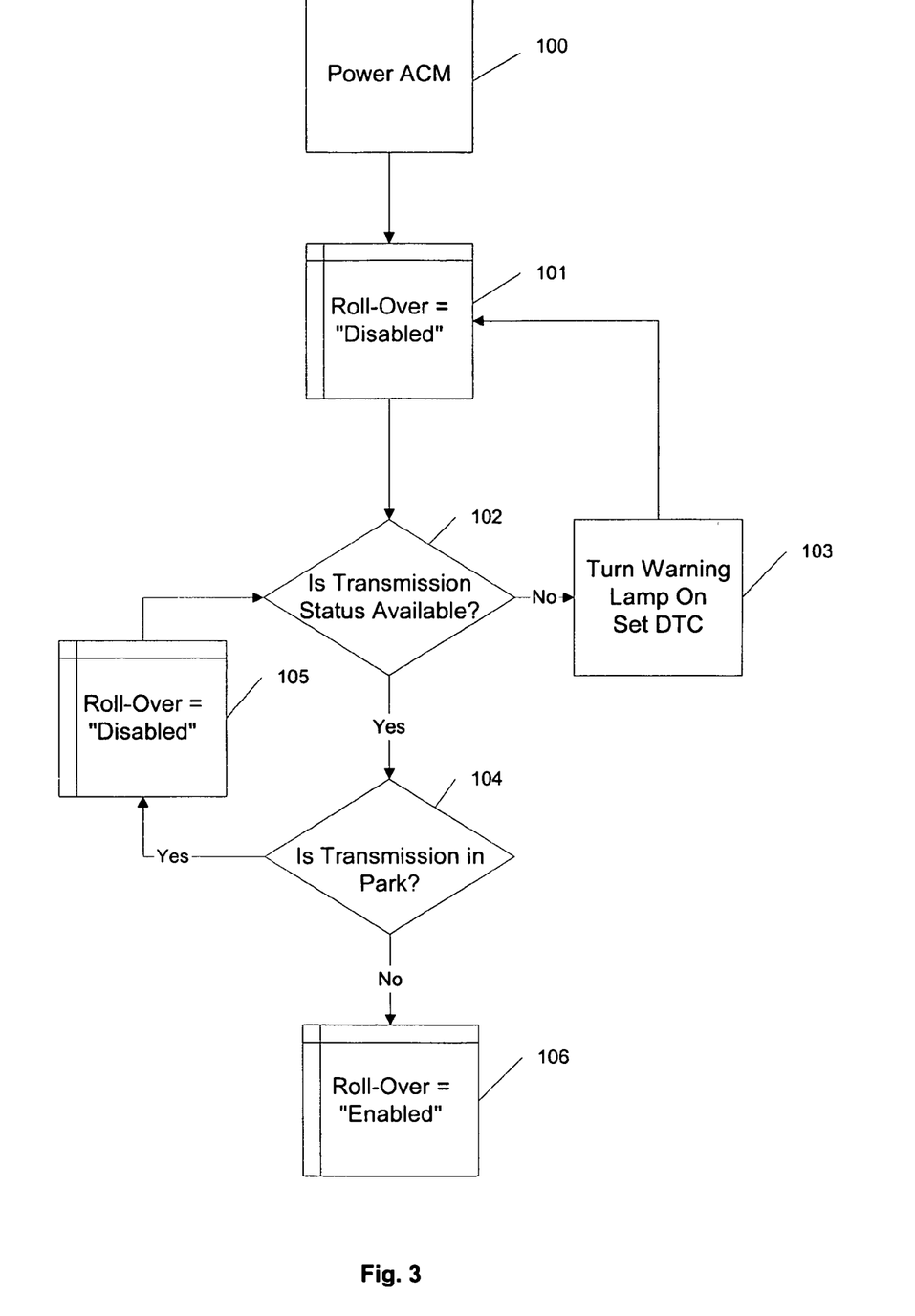
FIG. 3 is a flow chart of steps executed by one embodiment of the invention.

The additional external information received by the control module 22 can also be used to disable a detection system after it has been enabled. Referring to the previous example, after the rollover detection has been enabled, the control module 22 could continue to monitor any available additional external information and disable the rollover detection if the transmission is placed back in park. Similarly, the rollover detection could also default to "enabled" upon boot-up or power-up, rather than "disabled," and the control module 22 could monitor for conditions when the detection system should be disabled rather than enabled.

Figure 4:
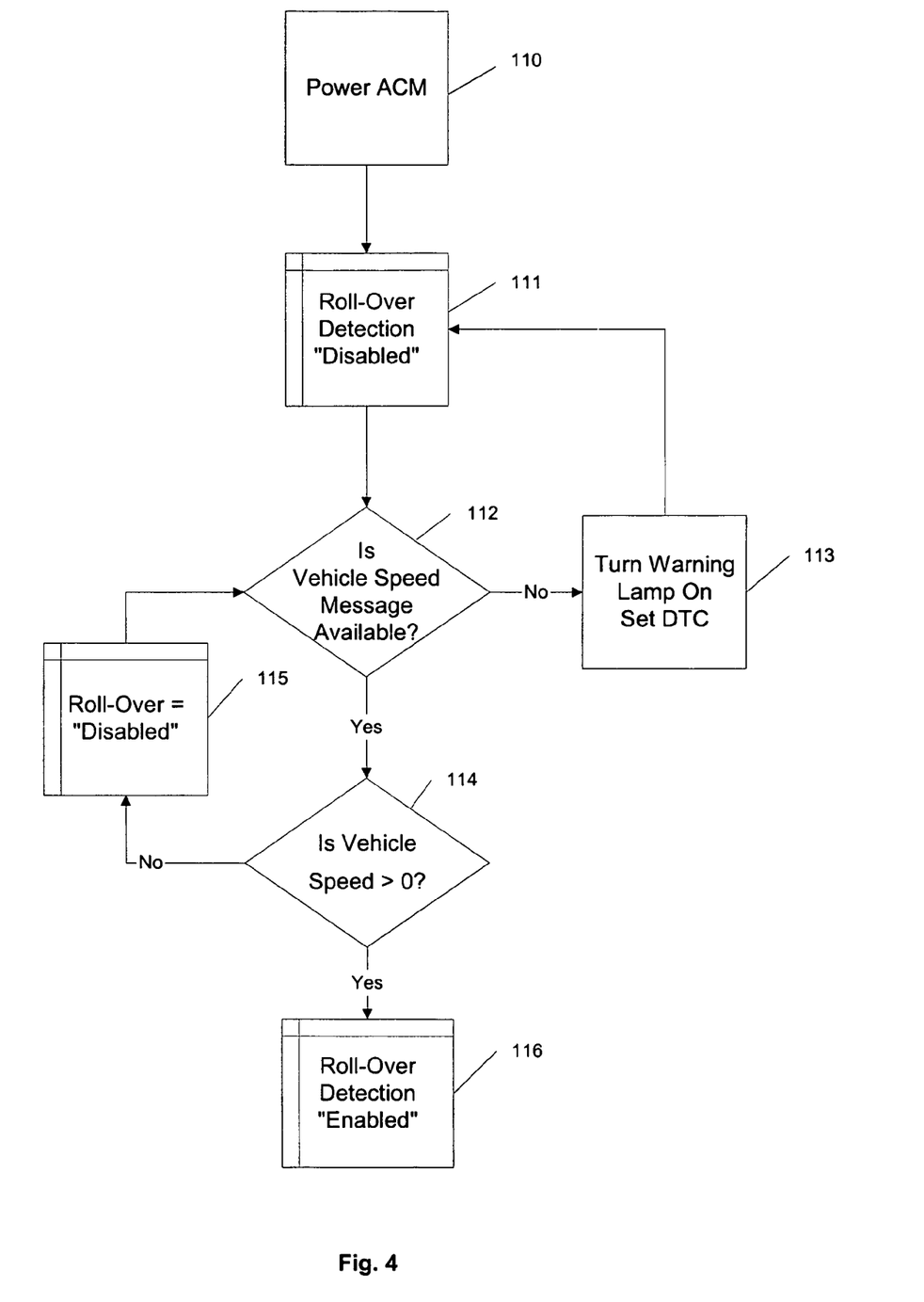
FIG. 4 is another flow chart of steps executed by one embodiment of the invention.

FIG. 4 illustrates another embodiment of the invention where speed information rather than transmission information is used to control activation of a safety system. In the FIG. 4 embodiment, the control module 22 is configured to determine whether the vehicle 10 is in a mode in which rollover detection (or more broadly, detection of a predetermined condition) is appropriate. As shown, the first step in the process is an initial power-up or boot-up process (step 110). Following power-up, the initial default status of rollover detection is set to "disabled" (step 111). In the disabled mode, the control module 22 senses the inputs from the internal sensors 64 and 66 as it is configured to do, but disregards the inputs. In the disabled mode, the control module 22 does not process the inputs to determine if a safety system should be activated. The control module 22 then checks to see if additional external information is available, as shown at step 112. In the example shown, a check of speed information is made. If speed information is not available, the control module generates a signal to turn on a warning lamp indicating that the control module is not receiving the speed information, as shown at step 113. If speed information is available, the control module 22 determines whether the speed is greater than zero (step 114). If not, then the mode of rollover detection is set to disabled (step 115). Otherwise, the rollover detection mode is set to enabled (step 116). In other words, if the control module 22 receives information that indicates that the vehicle is in use, then it is appropriate or at least more appropriate to check for the existence of a rollover condition and, if necessary, activate a safety system such as an airbag.

Other vehicle systems than transmission and speed could be monitored to determine if an unsafe condition warranting activation of vehicle safety system is unlikely to occur. For example, brake status or information from the electronic stability control ("ESC") could be used to determine whether a rollover condition could actually occur given the status of the vehicle. The ESC uses information from numerous other vehicle systems including the wheel speed sensors, the steering wheel angle sensor, the yaw rate and lateral acceleration sensors, and the master cylinder pressure sensor to compare the intended path of the operator of the vehicle to the true path of the vehicle. Any of these vehicle systems, or other vehicle systems, could provide vehicle status information that, if consistent with a condition where an unsafe condition would be unlikely to occur, may disable a vehicle safety system.

Figure 5:
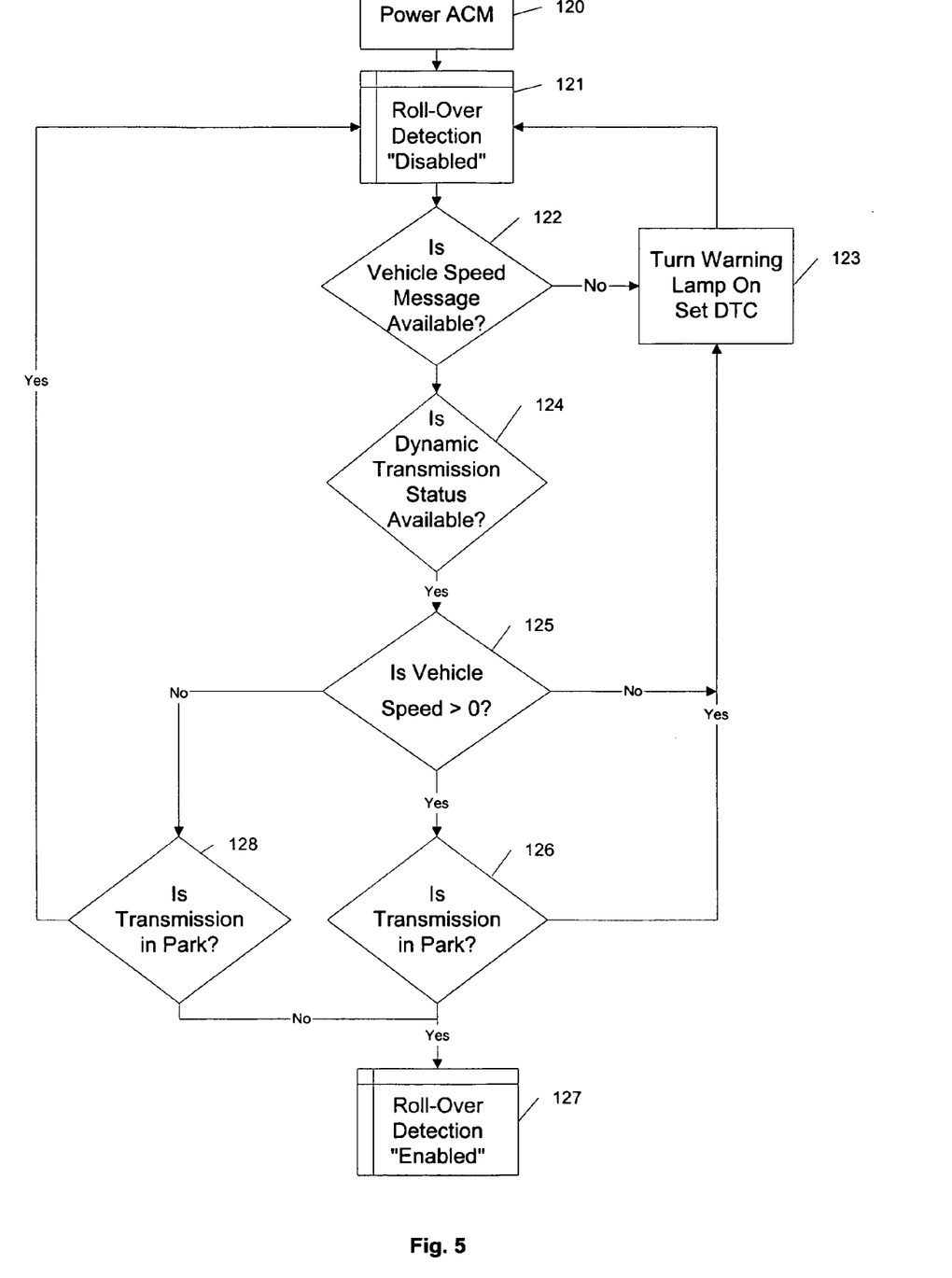
FIG. 5 is another flow chart of steps executed by one embodiment of the invention.

FIG. 5 illustrates yet another embodiment of the invention where multiple sources of external information are used. In the FIG. 5 embodiment, both speed and transmission information are used. However, information in various combinations from the sensors 30, 32, 34, 36, 41, 43, 45, 47, 50, 52, 54, and engine and transmission sensors discussed above could also be used or substituted. Various rules, select statements, or logic (e.g., fuzzy logic) could be used to process the information from the sensors to determine the state of the vehicle. Following power-up (step 120), the initial default status of rollover detection is set to "disabled" (step 121). In the disabled mode, the control module 22 senses inputs from the internal sensors 64 and 66 as it is configured to do, but disregards the inputs. In the disabled mode, the control module 22 does not process the inputs to determine if a safety system should be activated. The control module 22 then checks to see if additional external information (in the form of speed information) is available, as shown at step 122. If speed information is not available, the control module generates a signal to turn on a warning lamp indicating that the control module is not receiving the speed information, as shown at step 123. If speed information is available, the control module 22 determines whether addition external information (in the form of transmission information) is available, as shown at step 124. If transmission information is not available, the control module generates a signal to turn on a warning lamp (step 123).

If both the speed information and transmission information are available, the control module 22 determines whether the vehicle speed is greater than zero (step 125). If the detected speed is greater than zero, the control module determines whether the transmission is in park (step 126). If so, a conflict between the speed sensor indicating a speed greater than zero and the transmission being in park (presumably corresponding to the vehicle 10 being in a stationary position) exists. And, a warning signal is generated (step 123). If it is determined that the transmission is not in park, then the mode of rollover detection is set to enabled (step 127).

Just as when the speed is greater than zero, if the detected speed is not greater than zero, the control module performs a check of transmission status (step 128). However, when the speed is not greater than zero, an indication that the transmission is in park is consistent with a stationary condition of the vehicle and the rollover detection mode is set to disabled. If the transmission is not in park, then it is possible that the vehicle is not currently moving, but movement could occur in the future. (For example, a car whose transmission is not in park, but which is currently positioned on a relatively flat area could be bumped and caused to roll. Thus, any occupants inside would benefit from being protected by an occupant safety system.) Under these conditions, the rollover detection mode is set to enabled (step 127).

As can be seen from the above, embodiments of the invention provide devices and methods for reducing inappropriate activation of a vehicle occupant safety system.

As should be apparent to one of ordinary skill in the art, the systems shown in the figures are models of what actual systems might be like. Many of the components and logical structures described are capable of being implemented in software which may be stored as instructions on a computer readable medium (such as an optical disc, disc drive, RAM, ROM, etc.) and executed by a microprocessor or a similar device. Many of the same components are also capable of being implemented in hardware using a variety of components including, for example, application specific integrated circuits ("ASICs").

The invention claimed is:

1. A method of controlling detection of a safety system activation condition, the method comprising:
 disabling detection of the safety system activation condition when the safety system activation condition is unlikely to occur by sensing and disregarding information from a first set of sensor, the first set of sensors configured to sense if the safety system activation condition is occurring;
 determining if information from a second set of sensors is available;
 when information from the second set of sensors is available, determining a value of the information from the second set of sensors; and
 when the value of the information from the second set of sensors indicates that the safety system activation condition could occur, enabling detection of the safety system activation condition.

2. The method as claimed in claim 1, further comprising generating a warning signal when information from the second set of sensors is not available.

3. The method as claimed in claim 1, further comprising receiving the information from the second set of sensors over a vehicle bus.

4. The method as claimed in claim 1, further comprising sensing and processing information from the first set of sensors when detection of a safety system activation condition is enabled.

5. A method of controlling detection of a safety system activation condition, the method comprising:
 enabling detection of a safety system activation condition;
 sensing and processing information from a first set of sensors when detection of the safety system activation condition is enabled, the first set of sensors configured to sense if the safety system activation condition is occurring;
 determining if information from a second set of sensors is available;
 when information from the second set of sensors is available, determining a value of the information from the second set of sensors; and
 when the value of the information from the second set of sensors indicates that the safety system activation condition is unlikely to occur, disabling detection of the safety system activation condition by sensing and disregarding information from the first set of sensors.

6. The method as claimed in claim 5, further comprising generating a warning signal when information from the second set of sensors is not available.

7. The method as claimed in claim 5, further comprising receiving the information from the second set of sensors over a vehicle bus.

8. A computer readable medium storing computer executable instructions for controlling a vehicle safety system, the instructions comprising:
 disabling the vehicle safety system when an unsafe condition is unlikely to occur by sensing and disregarding information from a first set of sensors;
 determining if a set of vehicle status information is available;
 if the set of vehicle status information is available, determining a vehicle state based on the set of vehicle status information and determining whether the vehicle state is one in which the unsafe condition could occur; and
 if the vehicle state is one in which the unsafe condition could occur, enabling the vehicle safety system.

9. The computer readable medium as claimed in claim 8, wherein the instructions further comprise generating a warning perceptible to a human being if information from the set of vehicle status information is unavailable.

10. A method of controlling a vehicle safety system, the method comprising:
 selecting a set of vehicle status information, where the set of vehicle status information is limited to information regarding vehicle systems that perform operations required to fulfill a fundamental purpose of a vehicle;
 determining whether the selected set of information is available on a vehicle bus;
 if the selected set of information is not available, generating a warning signal perceptible by a human being;
 if the selected set of information is available, determining whether the information is consistent with a vehicle state in which an unsafe condition could occur;
 if the information is consistent with a vehicle state in which the unsafe condition could occur, enabling the vehicle safety system; and
 if the information is inconsistent with a vehicle state in which the unsafe condition could occur, disabling the vehicle safety system by sensing and disregarding information from a set of sensors.

11. The method as claimed in claim 10, further comprising disabling the vehicle safety system during boot-up.

12. A method of preventing activation of a passenger safety system during servicing of a vehicle, the method comprising:
 disabling the passenger safety system at power-up;
 selecting a set of vehicle status information, where the set of vehicle status information is limited to information regarding vehicle systems that perform operations required to fulfill a fundamental purpose of the vehicle;
 determining whether the selected set of information is available on a vehicle bus;
 if the selected set of information is available, determining whether the information is consistent with a vehicle state in which an unsafe condition could occur;

if the information is consistent with a vehicle state in which an unsafe condition could occur, enabling the passenger safety system;

if the information is inconsistent with a vehicle state in which an unsafe condition could occur, disabling the passenger safety system; and indicating a status of the passenger safety system so that a service technician can determine whether the passenger safety system has been enabled or disabled before servicing is performed.

* * * * *